(12) United States Patent
Oh et al.

(10) Patent No.: US 9,837,217 B2
(45) Date of Patent: Dec. 5, 2017

(54) CAPACITOR MODULE

(71) Applicant: SAMHWA CAPACITOR CO., LTD., Yongin-si (KR)

(72) Inventors: Young Joo Oh, Seoul (KR); Jung Rag Yoon, Yongin-si (KR); Ju Cheul Maeng, Yongin-si (KR)

(73) Assignee: SAMHWA CAPACITOR CO., LTD., Gyeonggi-Do (KR)

( * ) Notice: Subject to any disclaimer, the term of this patent is extended or adjusted under 35 U.S.C. 154(b) by 22 days.

(21) Appl. No.: 15/081,102

(22) Filed: Mar. 25, 2016

(65) Prior Publication Data

US 2016/0293345 A1  Oct. 6, 2016

(30) Foreign Application Priority Data

Apr. 3, 2015  (KR) .................. 10-2015-0047418

(51) Int. Cl.
| | |
|---|---|
| *H01G 9/10* | (2006.01) |
| *H01G 11/08* | (2013.01) |
| *H01G 11/74* | (2013.01) |
| *H01G 11/82* | (2013.01) |

(52) U.S. Cl.
CPC ............. *H01G 11/08* (2013.01); *H01G 11/74* (2013.01); *H01G 11/82* (2013.01); *Y02E 60/13* (2013.01); *Y02T 10/7022* (2013.01)

(58) Field of Classification Search
CPC ........ H01G 11/08; H01G 11/04; H01G 11/28; H01G 11/32; H01G 11/42; H01G 11/74; H01G 11/82
See application file for complete search history.

(56) References Cited

U.S. PATENT DOCUMENTS

| | | | | |
|---|---|---|---|---|
| 6,922,326 B2* | 7/2005 | Kubota | ................ | H01M 6/5011 361/274.1 |
| 7,126,810 B1* | 10/2006 | Mueller | .................. | H01G 9/14 361/227 |
| 7,477,505 B2* | 1/2009 | Timmerman | ............ | H01G 2/04 361/328 |
| 8,018,712 B2* | 9/2011 | Yang | ...................... | H02G 5/005 361/328 |
| 9,245,686 B2* | 1/2016 | Sevakivi et al. | ......... | H01G 4/28 |
| 2007/0053140 A1 | 3/2007 | Soliz | | |

(Continued)

FOREIGN PATENT DOCUMENTS

KR  101205331  11/2012

*Primary Examiner* — Nguyen Ha
(74) *Attorney, Agent, or Firm* — Cantor Colburn LLP

(57) ABSTRACT

A capacitor module comprises: a lower block panel including first conductive blocks arranged to be tightly attached to each other and respectively having a first lower coupling unit formed at one side and a second lower coupling unit formed at the other side; an upper block panel including second conductive blocks arranged to be tightly attached to each other and respectively having a second upper coupling unit formed at one side to be positioned on a top of the second lower coupling unit and a first upper coupling unit formed at the other side; and capacitors arranged to be positioned between the lower block panel and the upper block panel and respectively having a first external electrode connected to the first lower coupling unit or the second upper coupling unit and a second external electrode connected to the second lower coupling unit or the first upper coupling unit.

11 Claims, 6 Drawing Sheets

(56) References Cited

U.S. PATENT DOCUMENTS

2014/0377592 A1\* 12/2014 Pyzza .................... H01G 11/10
  429/7
2015/0187502 A1\* 7/2015 Hwang .................... H01G 4/38
  361/679.01

\* cited by examiner

US 9,837,217 B2

CAPACITOR MODULE

CROSS-REFERENCE TO RELATED APPLICATION

This application claims the benefit of Korean Patent Application No. 10-2015-0047418, filed on Apr. 3, 2015 in the Korean Intellectual Property Office, the disclosure of which is incorporated herein by reference.

BACKGROUND OF THE INVENTION

1. Field of the Invention

The present invention relates to a capacitor module, and particularly, to a capacitor module suitable for a high power energy supplying device applied to the fields of electric vehicle or hybrid vehicle manufacturing industry using electricity as a power source and wind power or solar energy generation industry and capable of improving scalability by using a structure of assembling the capacitor module by adding or deleting capacitors by simply coupling the capacitors using a conductive coupling member.

2. Description of the Related Art

A super capacitor or an electrolytic capacitor is assembled in a variety of forms. A super capacitor or an electrolytic capacitor assembled in a cylindrical form is assembled and used as a capacitor module by using a rectangular case.

Korea Patent Registration No. 1205331 (Patent document 1) relates to a capacitor module configured of a case body, a plurality of capacitors and upper and lower covers. The top and the bottom of the case body are open, and the plurality of capacitors is accommodated in the case body and connected in series or parallel by a plurality of bus bars. The upper and lower covers are respectively combined on the top and the bottom of the case body to prevent the capacitors from being damaged by external contaminant sources.

A conventional capacitor module as shown in Patent Document 1 has a problem in that the size of the case body should be redesigned when a super capacitor or an electrolytic capacitor (hereinafter, referred to as a capacitor) is added or deleted since side surfaces of the case body are formed in the shape of a plate, and release of heat is not easy when the heat is generated due to rapid recharge as the capacitor placed inside the case body is spaced apart from the case body.

(Patent document 1) Korea Patent Registration No. 1205331 (Registration date: Nov. 21, 2012)

SUMMARY OF THE INVENTION

Therefore, the present invention has been made in view of the above problems, and it is an object of the present invention to provide a capacitor module suitable for a high power energy supplying device applied to the fields of electric vehicle or hybrid vehicle manufacturing industry using electricity as a power source and wind power or solar energy generation industry and capable of improving scalability by using a structure of assembling the capacitor module by adding or deleting capacitors by simply coupling the capacitors using a conductive coupling member.

Another object of the present invention is to provide a capacitor module which can improve structural stability resistant to external impacts by firmly coupling a plurality of capacitors to each other by tightly attaching a plurality of conductive coupling members to each other and coupling the conductive coupling members to the capacitors so that the top or the bottom of the capacitors are covered with the conductive coupling members.

Still another object of the present invention is to provide a capacitor module which can easily exhaust heat generated by a plurality of capacitors to outside by tightly attaching a plurality of conductive coupling members to each other and coupling the conductive coupling members to the capacitors so that the top or the bottom of the capacitors are covered with the conductive coupling members.

To accomplish the above objects, according to one aspect of the present invention, there is provided a capacitor module comprising: a lower block panel including a plurality of first conductive blocks arranged to be tightly attached to each other and respectively having a first lower coupling unit formed at one side and a second lower coupling unit formed at the other side; an upper block panel including a plurality of second conductive blocks arranged to be tightly attached to each other and respectively having a second upper coupling unit formed at one side to be positioned on a top of the second lower coupling unit and a first upper coupling unit formed at the other side; and a plurality of capacitors arranged to be positioned between the lower block panel and the upper block panel and respectively having a first external electrode connected to the first lower coupling unit or the second upper coupling unit and a second external electrode connected to the second lower coupling unit or the first upper coupling unit.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
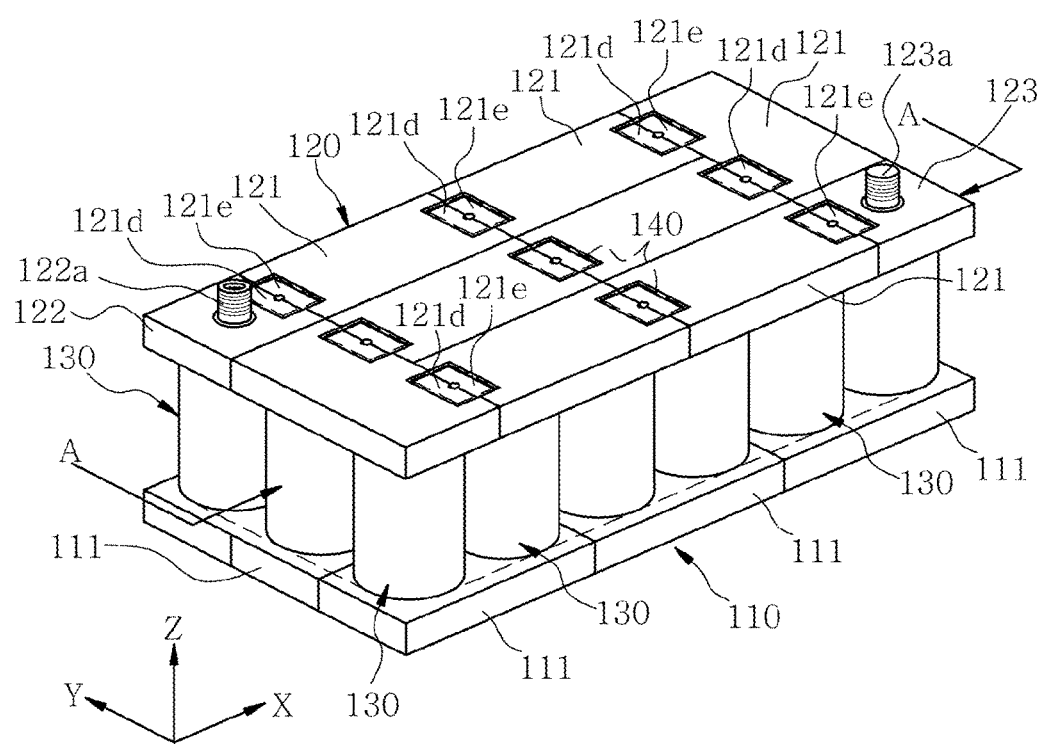
FIG. 1 is an assembly perspective view showing a capacitor module of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereafter, a preferred embodiment of a capacitor module of the present invention will be described in detail with reference to the accompanying drawings.

Figure 2:
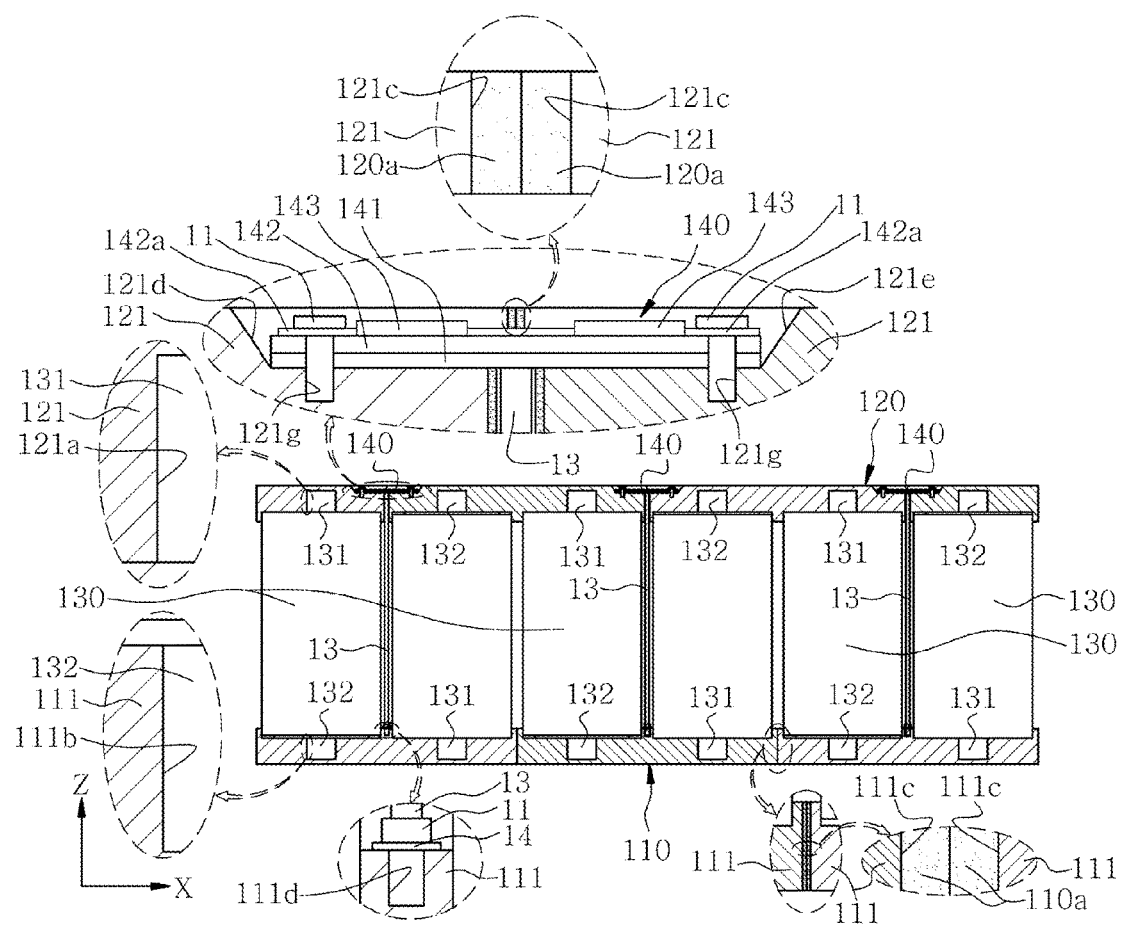
FIG. 2 is a cross-sectional view showing the capacitor module of FIG. 1 taken along the line A-A.
Figure 3:
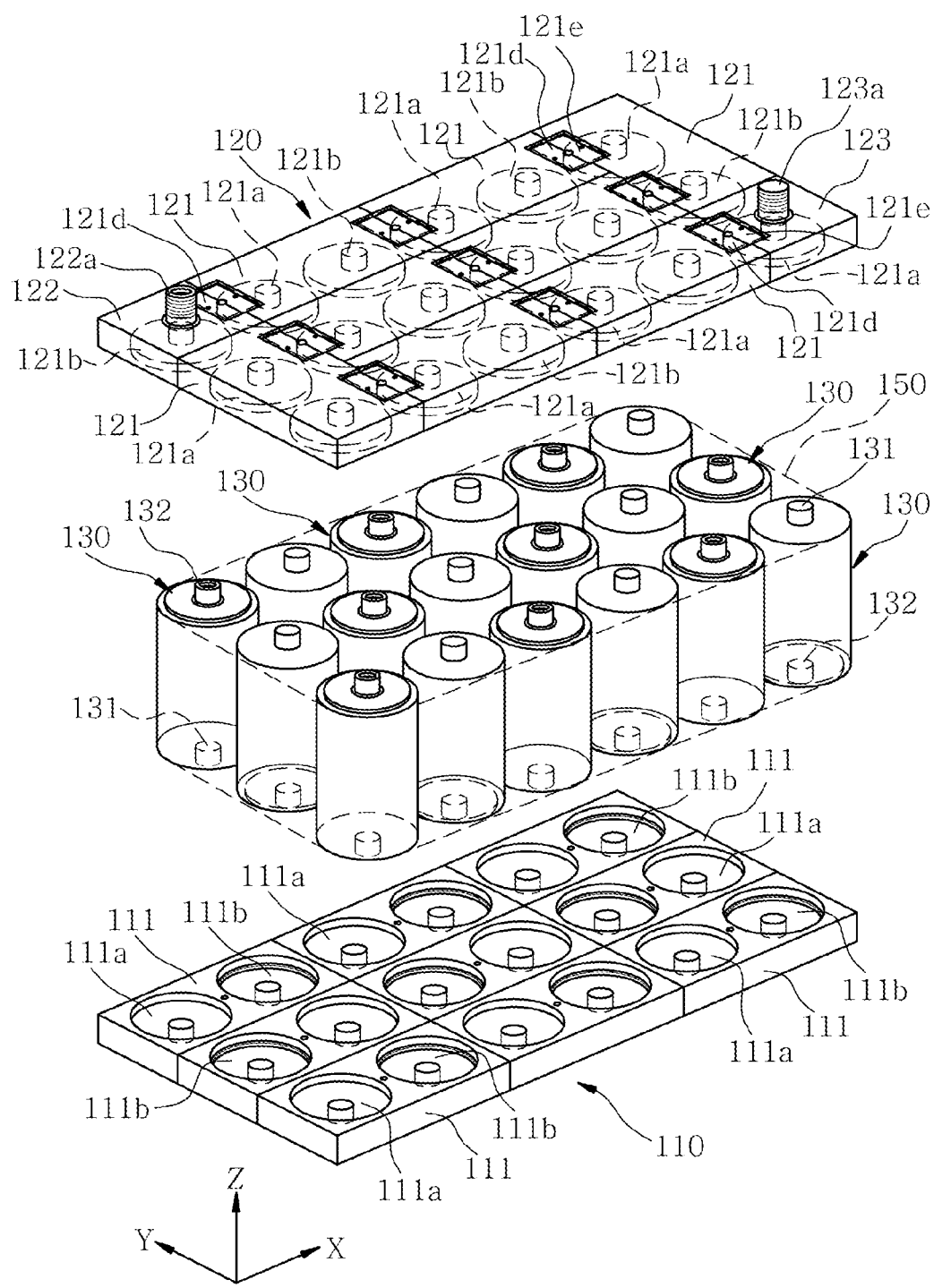
FIG. 3 is an exploded assembly perspective view showing the capacitor module in FIG. 1.

A capacitor module of the present invention is configured of a lower block panel 110, an upper block panel 120 and a plurality of capacitors 130 as shown in FIGS. 1 to 3.

The lower block panel 110 includes a plurality of first conductive blocks 111 arranged to be tightly attached to each other and having a first lower coupling unit 111a formed at one side and a second lower coupling unit 111b formed at the other side, and the upper block panel 120 includes a plurality of second conductive blocks 121, 122 and 123 arranged to be tightly attached to each other and having a second upper coupling unit 121b formed at one side to be positioned on the top of the second lower coupling unit 111b and a first upper coupling unit 121a formed at the other side. The plurality of capacitors 130 is arranged to be positioned between the lower block panel 110 and the upper block panel 120 and respectively has a first external electrode 131 connected to the first lower coupling unit 111a or the second upper coupling unit 121b and a second external electrode 132 connected to the second lower coupling unit 111b or the first upper coupling unit 121a.

The configuration of the capacitor module of the present invention is described below in more detail.

Figure 5:
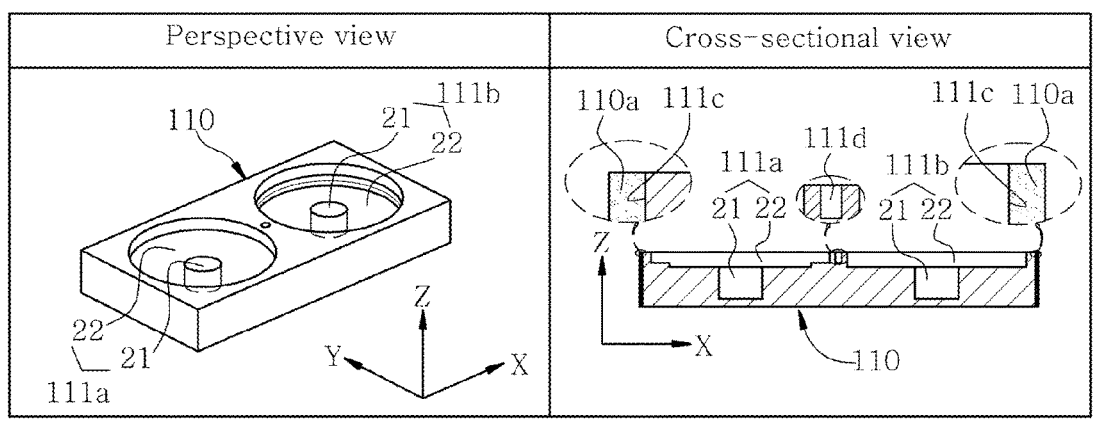
FIG. 5 is a table showing the first conductive block in FIG. 3.

The lower block panel 110 is configured of a plurality of first conductive blocks 111 as shown in FIGS. 2, 3 and 5, in which a first lower coupling unit 111a having an open top is formed at one side, and a second lower coupling unit 111b is formed at the other side to be spaced apart from the first lower coupling unit 111a having an open top. The plurality of first conductive blocks 111 is arranged in the shape of a rectangular panel to be tightly attached to each other in a first direction X or a second direction Y perpendicular to the first direction X to alternatively place the first lower coupling unit 111a and the second lower coupling unit 111b to form one lower block panel 110. The plurality of first conductive blocks 111 tightly attached to each other to form one lower block panel 110 is arranged to be tightly attached to each other in an electrically insulated state by attaching an insulation member 110a on each of the surfaces 111c tightly contacting with each other, i.e., side surfaces 111c.

In addition, the plurality of first conductive blocks 111 respectively includes a screw coupling groove 111d formed between the first lower coupling unit 111a and the second lower coupling unit 111b to be engaged with a screw 11 as shown in FIGS. 2, 3 and 5, and the screw 11 is inserted in a metal snap ring 14 connected to one end of a lead wire 13 to connect the metal snap ring 14 and the first conductive block 111 to be electrically conductive as the screw 11 is engaged with the screw coupling groove 111d.

Figure 4:
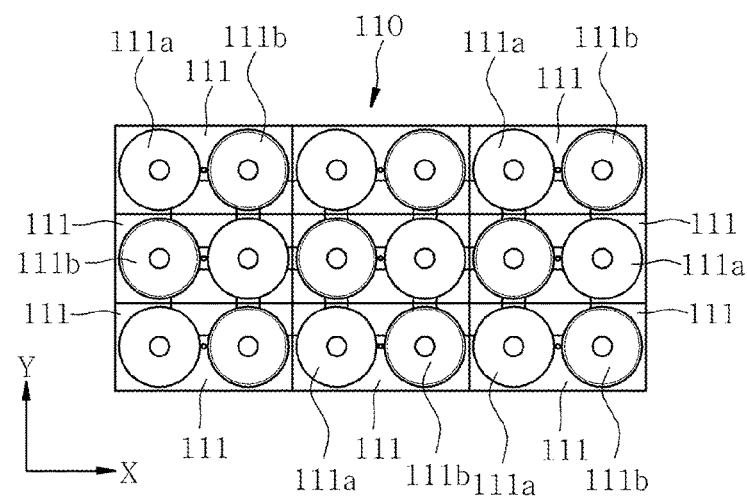
FIG. 4 is a plan view showing another embodiment of the lower block panel shown in FIG. 3.

The lower block panel 110 includes a protruding member 112 formed on each top surface of the plurality of first conductive blocks 111 as shown in FIG. 4, and the protruding member 112 is formed to be protruded between two capacitors 130 adjacent to each other in the first direction X and contacts with the surfaces of the two capacitors 130. That is, the protruding member 112 is extended to contact with the surfaces of two capacitors 130 on each top surface of the plurality of first conductive blocks 111 and formed in one piece to be spaced apart from the second conductive blocks 121, 122 and 123 so that heat can be easily exhausted to outside through the first conductive blocks 111 or the second conductive blocks 121, 122 and 123 formed of a metal material. For example, heat generated by the capacitor 130 placed at the center of the lower block panel 110 and the upper block panel 120 among the plurality of capacitors 130 placed between the lower block panel 110 and the upper block panel 120 can be easily transferred to the first conductive blocks 111 through the protruding member 112.

Figure 6:
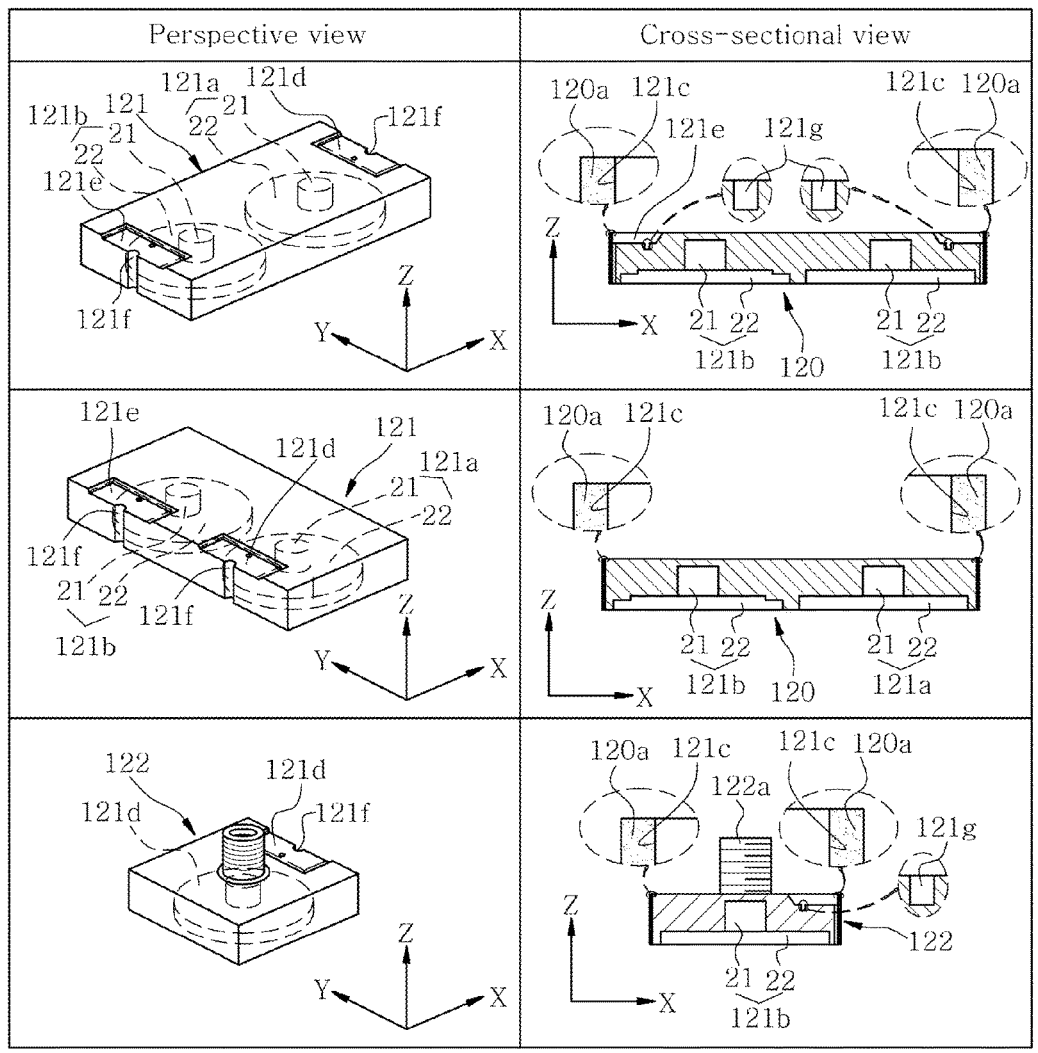
FIG. 6 is a table showing the second conductive block in FIG. 3.

The upper block panel 120 is configured of a plurality of second conductive blocks 121, 122 and 123 as shown in FIGS. 2, 3 and 6, and two of the plurality of second conductive blocks 121, 122 and 123 are formed as a first short axis block 122 and a second short axis block 123, and the others are formed as long axis blocks 121. Such an upper block panel 120 is assembled by arranging the other long axis blocks 121 in the shape of a rectangular panel to be tightly attached to the first short axis block 122 and the second short axis block 123 in the second direction Y perpendicular to the first direction X while the first short axis block 122 and the second short axis block 123 are arranged at an end of one side and at an end of the other side to face each other in the diagonal direction. Two of the first short axis block 122, the second short axis block 123 and the long axis blocks 121 forming the upper block panel 120 are arranged to be tightly attached to each other in an electrically insulated state by attaching an insulation member 120a on each of the surfaces 121c tightly contacting with each other, i.e., side surfaces 121c.

Among the plurality of second conductive blocks 121, 122 and 123 forming one upper block panel 120, the first short axis block 122 includes a first upper coupling unit 121a formed to have an open bottom, and the second short axis block 123 includes a second upper coupling unit 121b formed to have an open bottom. The other long axis blocks 121 respectively include a second upper coupling unit 121b formed at one side to have an open bottom and a first upper coupling unit 121a formed at the other side to be spaced apart from the second upper coupling unit 121b. The other long axis blocks 121 are arranged to alternatively place the first upper coupling unit 121a and the second upper coupling unit 121b in the first direction X and the second direction Y, and the long axis blocks 121 are arranged to place the second upper coupling unit 121b of the long axis block if the first upper coupling unit 121a of the first short axis block is placed in the first direction X and place the first upper coupling unit 121a of the long axis block if the second upper coupling unit 121b of the second short axis block is placed.

Among the plurality of second conductive blocks 121, 122 and 123 of the upper block panel 120, the first short axis block 122 includes a first board coupling groove 121d formed at the other side, and the second short axis block 123 includes a second board coupling groove 121e formed at one side, and the other long axis blocks 121 respectively include a first board coupling groove 121d formed at one side and a second board coupling groove 121e formed at the other side. The first short axis block 122, the second short axis block 123 and the other long axis blocks 121 are arranged to contact the first board coupling groove 121d and the second board coupling groove 121e each other when the first short axis block 122, the second short axis block 123 and the other long axis blocks 121 are tightly attached and coupled to each other to form the upper block panel 120. Here, external terminals 122a and 123a for connecting the capacitor module of the present invention to an external circuit (not shown) are formed on the top of the first short axis block 122 and the second short axis block 123, respectively.

A balancing board 140 is arranged in the first board coupling groove 121d and the second board coupling groove 121e arranged to contact with each other when the first short axis block 122, the second short axis block 123 and the other long axis blocks 121 are tightly attached and coupled to each other, and a semicircular penetration hole 121f is formed at one side or the other side of each of the first board coupling groove 121d and the second board coupling groove 121e.

The semicircular penetration hole 121f is positioned at one side or the other side of the first board coupling groove 121d and the second board coupling groove 121e and formed to penetrate the first short axis block 122, the second short axis block 123 and the long axis blocks 121 in a third direction Z perpendicular to the second direction Y so that the lead wire 13, one end of which is connected to the metal snap ring 14 connected to the first conductive block 11, is inserted and connected to the balancing board 140. That is, the semicircular penetration hole 121f is formed to be positioned at one side or the other side of the first board coupling groove 121d and the second board coupling groove 121e and forms one cylindrical penetration hole when the first short axis block 122, the second short axis block 123 and the long axis blocks 121 are arranged to be tightly attached to each other to face the first board coupling groove 121d and the second board coupling groove 121e each other, and thus the lead wire 13 connected to the first conductive block 111 can be electrically connected to the balancing board 140 with ease.

The balancing board 140 is configured of an insulation member 141, a printed circuit board 142, a pair of balancing circuit units 143 and an insulation sealing member 144 as shown in FIG. 2.

The insulation member 141 is formed in the shape of a plate formed of an insulation material such as plastic and inserted inside the first board coupling groove 121d and the second board coupling groove 121e to insulate the balancing board 140 from the plurality of second conductive blocks 121, 122 and 123 formed of a metal material.

The printed circuit board 142 includes a pair of conductive pads 142a inserted in the first board coupling groove 121d and the second board coupling groove 121e with the intervention of the insulation member 141 and electrically connected to the first short axis block 122, the second short axis block 123 or the long axis block 121 using a conductive screw 11. For example, the pair of conductive pads 142a are formed to be spaced apart from each other, and if one of the pair of conductive pads 142a is electrically connected to the first board coupling groove 121d formed in any one of the first short axis block 122, the second short axis block 123 and the long axis blocks 121, the other conductive pad 142a is electrically connected to the second board coupling groove 121e. A screw coupling groove 121g is formed in the second conductive blocks 121, 122 and 123 to be positioned at one side or the other side of the first board coupling groove 121d and the second board coupling groove 121e in order to fix the printed circuit board 142 using the conductive screw 11.

Since a publicized active or passive balancing circuit technique for controlling balancing of each capacitor 130 is applied to the pair of balancing circuit units 143, detailed description thereof will be omitted. Such a pair of balancing circuit units 143 are arranged at one side and the other side of the printed circuit board 142 to be spaced apart from each other and connected to the pair of conductive pads 142a to control balancing of the capacitor 130 connected to the first conductive block 111 and the second conductive block 121, 122 and 123. For example, as the pair of balancing circuit units 143 are respectively connected to the conductive pads 142a to be electrically conductive, the balancing circuit units control balancing of the capacitor 130, in which the first external electrode 131 is connected to the first lower coupling unit 111a or the first upper coupling unit 121a, and the second external electrode 132 is connected to the second lower coupling unit 111b or the second upper coupling unit 121b. Here, the first lower coupling unit 111a or the second lower coupling unit 111b is electrically connected to the first conductive block 111 through the lead wire 13 connected to the printed circuit board 142, and the lead wire 13 is connected to the printed circuit board 142 through a connector (not shown) or soldering, and thus a plurality of capacitors 130 is connected to each other in series to be easily scalable and structurally stable by a plurality of first conductive blocks 111 and a plurality of second conductive blocks 121, 122 and 123.

The insulation sealing member 144 is formed to be positioned on the top of the pair of balancing circuit units 143 to be filled in the first board coupling groove 121d and the second board coupling groove 121e to protect the pair of balancing circuit units 143 from moisture or shock existing outside. An insulating cover (not shown) is used as the insulation sealing member 144 to easily assemble and disassemble the lower block panel 110 or the upper block panel 120, and the insulating cover is connected to the first conductive block 111 or the second conductive block 121, 122 and 123 using an insulating screw (not shown) and covers the first board coupling groove 121d or the second board coupling groove 121e and protects the pair of balancing circuit units 143 from moisture or shock existing outside. When the insulating cover is connected to the first conductive block 111 or the second conductive block 121, 122 and 123 using the insulating screw, a screw hole (not shown) is formed at a position on the top of the first conductive block 111 or the second conductive block 121, 122 and 123 where the insulating screw is engaged.

The first lower coupling unit 111a, the second lower coupling unit 111b, the first upper coupling unit 121a and the second upper coupling unit 121b formed in the first conductive block 111 or the second conductive block 121, 122 and 123 are respectively configured of an electrode insertion hole 21 and a body insertion hole 22 as shown in FIGS. 5 and 6.

The electrode insertion hole 21 is formed at the center, one side or the other side of the first conductive block 111 or the second conductive block 121, 122 and 123 to press-insert the first external electrode 131 or the second external electrode 132 of the capacitor 130, and the body insertion hole 22 is formed to communicate with the electrode insertion hole 21 and insert part of the outer periphery of the capacitor 130 so that when a plurality of capacitors 130 is assembled on the first conductive block 111 or the second conductive block 121, 122 and 123, the capacitors 130 are supported by the electrode insertion holes 21 and the body insertion holes 22, and the plurality of capacitors 130 is connected to each other in series to be structurally stable by a plurality of first conductive blocks 111 or a plurality of second conductive blocks 121, 122 and 123.

The plurality of capacitors 130 is respectively provided with a first external electrode 131 at the end of one side and a second external electrode 132 at the end of the other side as shown in FIGS. 1 to 3. That is, the plurality of capacitors 130 is respectively provided with a first external electrode 131 at the end of one side of a cylindrical body 133 and a second external electrode 132 at the end of the other side, and if the first external electrode 131 is used as a positive electrode, the second external electrode 132 is used as a negative electrode, and if the first external electrode 131 is used as a negative electrode, the second external electrode 132 is used as a positive electrode, and thus the plurality of capacitors 130 is connected to each other in series by the lower block panel 110 and the upper block panel 120. The first external electrode 131 and the second external electrode 132 are respectively formed to have a cross section of a circular, rectangular or polygonal shape, like the first external electrode 131 shown in FIG. 7. Here, an electrolytic capacitor or a super capacitor is used as the plurality of capacitors 130, and each cylindrical body 133 determines capacitance of the capacitor 130, and part of the cylindrical body 133 is inserted in the body insertion hole 22 and supported by the first conductive block 111 and the second conductive block 121, 122 and 123 to have a stable structure. When the cylindrical body 133 is inserted in the body insertion hole 22, the cylindrical body 133 is inserted while the outer periphery of the cylindrical body 133 is wrapped by a vinyl or plastic insulation member (not shown) so that the cylindrical body 133 is insulated from the first conductive block 111 or the second conductive block 121, 122 and 123.

Figure 7:
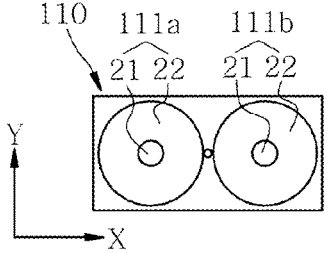
FIG. 7 is a table showing various embodiments of the first conductive block, the second conductive block and the capacitors in FIG. 3.

The electrode insertion hole 21 formed at the center, one side or the other side of the first conductive block 111 or the second conductive block 121, 122 and 123 described above according to the shape of the first external electrode 131 and the second external electrode 132 is formed to have a cross section of a circular, rectangular or polygonal shape to correspond to the shape of the first external electrode 131 and the second external electrode 132 as shown in FIG. 7 so that the first external electrode 131 or the second external electrode 132 may be supported while being electrically connected to the first conductive block 111 or the second conductive block 121, 122 and 123 by press-inserting and combining the first external electrode 131 or the second external electrode 132. If a plurality of capacitors 130 is combined to the first conductive block 111 or the second conductive block 121, 122 and 123, the plurality of capacitors 130 is surrounded and wrapped by a vinyl or plastic insulation member 150 (shown in FIG. 3), and thus the capacitor module of the present invention may easily release heat through the first conductive block 111 or the second conductive block 121, 122 and 123 and maintain a further firm and stable structure.

When the second external electrode 132 is used as a positive electrode and the first external electrode 131 is used as a negative electrode, the second external electrode 132 is press-inserted and connected to the first lower coupling unit 111*a* and the second upper coupling unit 121*b* and the first external electrode 131 is press-inserted and connected to the second lower coupling unit 111*b* and the first upper coupling unit 121*a*, and thus the plurality of capacitors 130 is connected to each other in series by a plurality of first conductive blocks 111 and a plurality of second conductive blocks 121, 122 and 123 to configure one capacitor module of the present invention. For example, when the second external electrode 132 is used as a positive electrode and the first external electrode 131 is used as a negative electrode, the plurality of capacitors 130 is connected to each other in series by a plurality of first conductive blocks 111 and a plurality of second conductive blocks 121, 122 and 123 as the plurality of second conductive blocks 121, 122 and 123 is positioned at the center of the first conductive block 111, i.e., between the first lower coupling unit 111*a* and the second upper coupling unit 121*b*, from a surface 121*c* where the plurality of second conductive blocks 121, 122 and 123 contacts with each other in the first direction X. A cylindrical super capacitor or electrolytic capacitor is used as the plurality of capacitors 130.

A plurality of capacitors 130 connected to each other in series by a plurality of first conductive blocks 111 and a plurality of second conductive blocks 121, 122 and 123 is respectively connected to a pair of balancing circuit units 143 so that balancing is controlled by the balancing circuit units 143, and since heat generated while the capacitors operate is easily exhausted to the top or bottom by the plurality of first conductive blocks 111 and the plurality of second conductive blocks 121, 122 and 123 formed of a metal material, electrical characteristics can be further improved.

The capacitor module of the present invention can be applied to the fields of capacitor module manufacturing industry, electric vehicle or hybrid vehicle manufacturing industry using electricity as a power source and a wind power or solar energy generation industry.

The capacitor module of the present invention is advantageous in that scalability can be improved by adding or deleting capacitors by simply coupling the capacitors using a conductive coupling member, and structural stability resistant to external impacts can be improved by firmly coupling a plurality of capacitors to each other by tightly attaching a plurality of conductive coupling members to each other and coupling the conductive coupling members to the capacitors so that the top or the bottom of the capacitors are covered with the conductive coupling members, and, in addition, heat generated by the plurality of capacitors can be easily exhausted to outside by tightly attaching a plurality of conductive coupling members to each other and coupling the conductive coupling members to the capacitors so that the top or the bottom of the capacitors are covered with the conductive coupling members.

The capacitor module of present invention described above is suitable for a high power energy supplying device applied to the fields of electric vehicle or hybrid vehicle manufacturing industry using electricity as a power source and wind power or solar energy generation industry and capable of improving scalability by using a structure of assembling the capacitor module by adding or deleting capacitors by simply coupling the capacitors using a conductive coupling member, improving structural stability resistant to external impacts by firmly coupling a plurality of capacitors to each other by tightly attaching a plurality of conductive coupling members to each other and coupling the conductive coupling members to the capacitors so that the top or the bottom of the capacitors are covered with the conductive coupling members, and easily exhausting heat generated by the plurality of capacitors to outside by tightly attaching a plurality of conductive coupling members to each other and coupling the conductive coupling members to the capacitors so that the top or the bottom of the capacitors are covered with the conductive coupling members.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A capacitor module comprising:
   a lower block panel including a plurality of first conductive blocks arranged to be tightly attached to each other and respectively having a first lower coupling unit formed at one side and a second lower coupling unit formed at the other side to be spaced apart from the first lower coupling unit;
   an upper block panel including a plurality of second conductive blocks arranged to be tightly attached to each other and respectively having a second upper coupling unit formed at one side to be positioned on a top of the second lower coupling unit and a first upper coupling unit formed at the other side; and
   a plurality of capacitors arranged to be positioned between the lower block panel and the upper block panel and respectively having a first external electrode connected to the first lower coupling unit or the second upper coupling unit and a second external electrode connected to the second lower coupling unit or the first upper coupling unit, wherein the plurality of first conductive blocks is arranged in a shape of a rectangular panel to be tightly attached to each other in a first direction or a second direction perpendicular to the first direction to alternatively place the first lower coupling unit and the second lower coupling unit and is arranged to be tightly attached to each other in an electrically insulated state by attaching an insulation member on each of surfaces tightly contacting with each other.

2. The capacitor module according to claim 1, wherein the plurality of first conductive blocks respectively includes a screw coupling groove formed between the first lower coupling unit and the second lower coupling unit to be engaged with a screw, and the screw is inserted in a metal snap ring connected to one end of a lead wire to connect the metal snap ring and the first conductive blocks to be electrically conductive as the screw is engaged with the screw coupling groove.

3. The capacitor module according to claim 1, wherein the lower block panel includes a protruding member formed on each top surface of the plurality of first conductive blocks, and the protruding member is formed to be protruded between two capacitors adjacent to each other in the first direction and contacts with surfaces of the two capacitors.

4. The capacitor module according to claim 1, wherein two of the plurality of second conductive blocks are formed as a first short axis block and a second short axis block, and the others are formed as long axis blocks, wherein the long axis blocks are arranged in a shape of a rectangular panel to be tightly attached to the first short axis block and the second short axis block in the second direction while the first short axis block and the second short axis block are arranged at an end of one side and at an end of the other side to face each other in a diagonal direction, and the first short axis block, the second short axis block and the long axis blocks are arranged to be tightly attached to each other in an electrically insulated state by attaching an insulation member on each of surfaces tightly contacting with each other, and the first short axis block includes the first upper coupling unit, the second short axis block includes the second upper coupling unit, and the other long axis blocks respectively include the second upper coupling unit at one side and the first upper coupling unit at the other side to be spaced apart from the second upper coupling unit.

5. The capacitor module according to claim 4, wherein the other long axis blocks are arranged to alternatively place the first upper coupling unit and the second upper coupling unit in the first direction and the second direction, and the long axis blocks are arranged to place the second upper coupling unit of the long axis block if the first upper coupling unit of the first short axis block is placed in the first direction and place the first upper coupling unit of the long axis block if the second upper coupling unit of the second short axis block is placed.

6. The capacitor module according to claim 1, wherein the upper block panel is configured of a plurality of second conductive blocks, and two of the plurality of second conductive blocks are formed as a first short axis block and a second short axis block, and the others are formed as long axis blocks, wherein the first short axis block includes a first board coupling groove formed at the other side, the second short axis block includes a second board coupling groove formed at one side, and the other long axis blocks respectively include a first board coupling groove formed at one side and a second board coupling groove formed at the other side, wherein the first short axis block, the second short axis block and the other long axis blocks are arranged to contact the first board coupling groove and the second board coupling groove when the first short axis block, the second short axis block and the other long axis blocks are tightly attached and coupled to each other to form the upper block panel, and a balancing board is arranged in the first board coupling groove and the second board coupling groove, and a semicircular penetration hole is formed at one side or the other side of the first board coupling groove and the second board coupling groove.

7. The capacitor module according to claim 6, wherein the semicircular penetration hole is positioned at one side or the other side of the first board coupling groove and the second board coupling groove and formed to penetrate the first short axis block, the second short axis block and the long axis blocks in a third direction perpendicular to the second direction so that the lead wire, one end of which is connected to the metal snap ring connected to the first conductive block, is inserted and connected to the balancing board, and the balancing board is configured of a printed circuit board including a pair of conductive pads inserted in the first board coupling groove and the second board coupling groove with intervention of an insulation member and electrically connected to the first short axis block, the second short axis block or the long axis block using a conductive screw, and a pair of balancing circuit units arranged at one side and the other side of the printed circuit board to be spaced apart from each other and connected to the pair of conductive pads to control balancing of the capacitor connected to the first conductive block and the second conductive block, and the pair of balancing circuit units are respectively connected to the lead wire connected to the first conductive block.

8. The capacitor module according to claim 1, wherein the first lower coupling unit, the second lower coupling unit, the first upper coupling unit and the second upper coupling unit are respectively configured of:
an electrode insertion hole formed in the first conductive block or the second conductive block to press-insert the first external electrode or the second external electrode of the capacitor; and
a body insertion hole communicating with the electrode insertion hole to insert part of an outer periphery of the capacitor and support the capacitor.

9. The capacitor module according to claim 8, wherein the electrode insertion hole is formed to have a cross section of a circular or polygonal shape.

10. The capacitor module according to claim 1, wherein the plurality of capacitors is respectively provided with a first external electrode at an end of one side and a second external electrode at an end of the other side, and if the first external electrode is used as a positive electrode, the second external electrode is used as a negative electrode, and if the first external electrode is used as a negative electrode, the second external electrode is used as a positive electrode, and thus the plurality of capacitors is connected to each other in series by the lower block panel and the upper block panel.

11. The capacitor module according to claim 10, wherein the first external electrode and the second external electrode are respectively formed to have a cross section of a circular or polygonal shape.

* * * * *